United States Patent [19]

Renvall

[11] Patent Number: 5,451,760
[45] Date of Patent: Sep. 19, 1995

[54] METHOD OF REGISTERING, TRANSFERRING AND STORING INFORMATION

[76] Inventor: Henrik G. Renvall, Erlangengatan 8, S-632 30 Eskilstuna, Sweden

[21] Appl. No.: 945,648
[22] PCT Filed: Nov. 23, 1990
[86] PCT No.: PCT/SE90/00767
    § 371 Date: Oct. 26, 1992
    § 102(e) Date: Oct. 26, 1992
[87] PCT Pub. No.: WO91/02447
    PCT Pub. Date: Mar. 7, 1991

[30] Foreign Application Priority Data

Mar. 27, 1990 [SE] Sweden .................. 9001098

[51] Int. Cl.⁶ ............................................. G06K 7/10
[52] U.S. Cl. ................................................ 235/462
[58] Field of Search ................ 235/462, 472, 375;
                                  364/401, 413.02, 413.01, 900, 200

[56] References Cited

U.S. PATENT DOCUMENTS

| | | | |
|---|---|---|---|
| 4,476,381 | 10/1984 | Rubin | 235/385 X |
| 4,481,412 | 11/1984 | Fields | 235/472 |
| 4,516,016 | 5/1985 | Kodron | 235/472 |
| 4,654,793 | 3/1987 | Elrod | 364/401 |
| 4,685,702 | 8/1987 | Kazuharu | 235/375 |
| 4,825,058 | 4/1989 | Poland | 235/472 |
| 4,857,716 | 8/1989 | Gombrich et al. | 235/472 |
| 4,918,604 | 4/1990 | Baum | 364/413.01 |
| 4,952,785 | 8/1990 | Kikuda | 235/462 |
| 4,991,091 | 2/1991 | Allen | 364/413.02 |
| 5,227,617 | 7/1993 | Christopher et al. | 235/462 X |

FOREIGN PATENT DOCUMENTS

| | | | |
|---|---|---|---|
| 2583546 | 12/1986 | France | 235/375 |
| 3721609 | 8/1988 | Germany . | |
| 60-69788 | 4/1985 | Japan . | |
| 880444 | 8/1989 | Norway . | |

Primary Examiner—Donald Hajec
Assistant Examiner—Jeffrey R. Filipek
Attorney, Agent, or Firm—Merchant & Gould, Smith, Edell, Welter & Schmidt

[57] ABSTRACT

If each part information, such as a product, a measure, a routine, a text portion etc. in an information handling system is given a bar code (2), and if these items of part information are stored in clear (3) together with their bar codes in bar code tables (1) and in the computers (6) included in the system, simple and rational registering, transferring and storing of information can be carried out as follows. Selected items of part information which together form information to be registered, transferred and stored, are registered in that the corresponding bar codes are read by means of a bar code reader (4) and are entered into a computer (6). The computer is caused to print the inputted bar codes and the corresponding items of part information in clear on a sheet of paper (8).

6 Claims, 6 Drawing Sheets

FIG.2

| NAME OF THE PATIENT | A ASON | ‖‖‖ |
| --- | --- | --- |
| PERSONAL NUMBER | 999999-9999 | ‖‖‖ |
| MEDICIN | EPIKUREN | ‖‖‖ |
| DOSE | 3 x 20ml | ‖‖‖ |
| COMMENTS | / | |
| NAME OF THE DOCTOR | DR. BSON | ‖‖‖ |

20

21

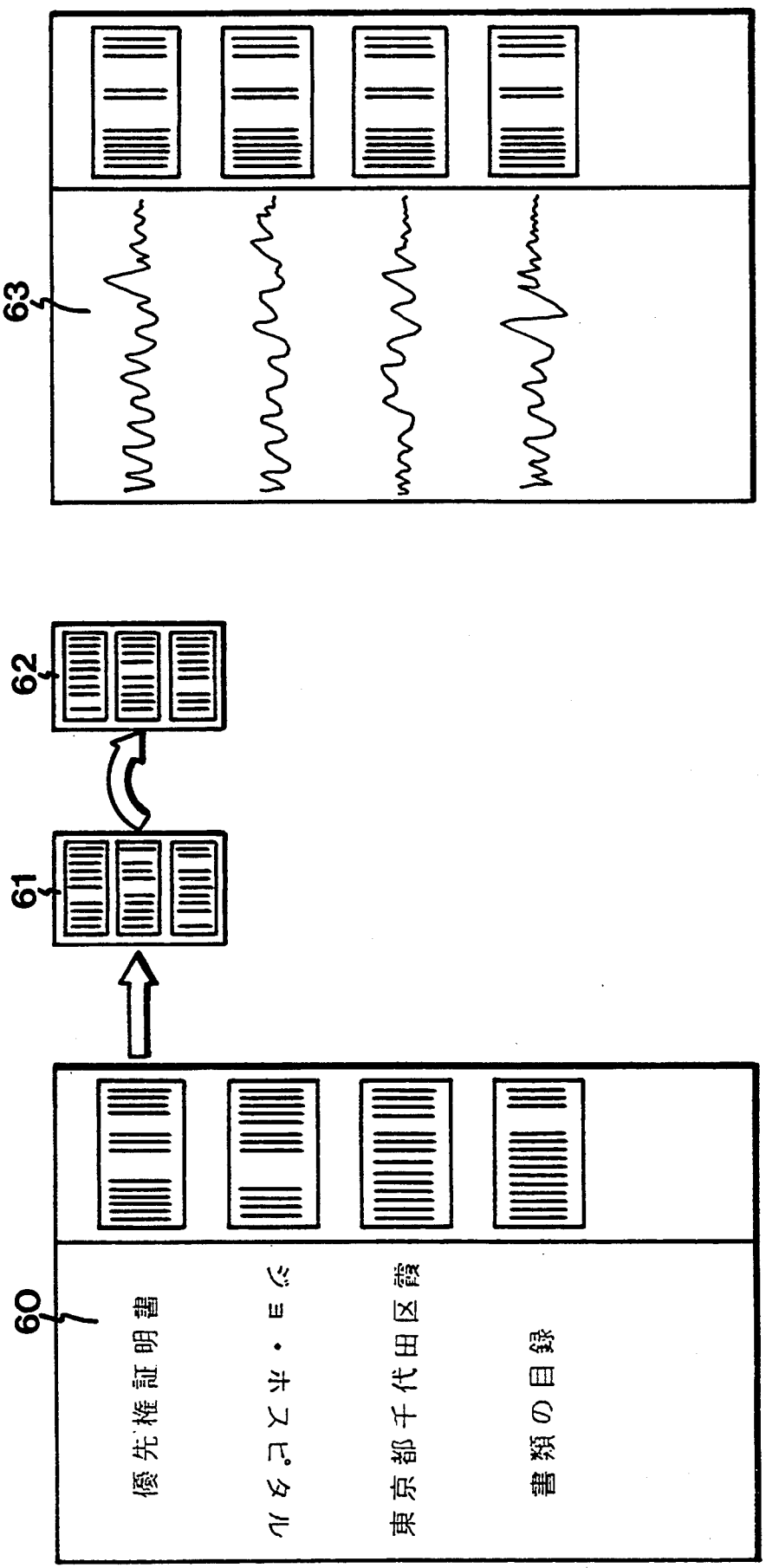

METHOD OF REGISTERING, TRANSFERRING AND STORING INFORMATION

BACKGROUND OF THE INVENTION

The present invention relates to a method of registering, transferring and storing information in a form which permits simple and flexible handling of information, said information consisting of items of part information which is selected among a plurality of predetermined items of part information, each of which corresponds to a predetermined bar code and each of which is stored together with the corresponding bar code in a computer and on a medium which permits reading of the bar codes by means of a bar code reader, which method comprises registering of the selected part information in that the corresponding bar codes are read by means of a bar code reader and are entered into the computer.

In recent years, a great deal of the handling of information has been computerised in many companies, authorities and institutes. This has brought many advantages such as saving of time, possibilities of rational handling of information, of producing statistics etc., but has also resulted in quite a few problems, implying that the new computer systems did not always come up to expectations.

As an example of the problems in computerised handling of information, it may be mentioned that entering information into the computer is a time-consuming operation, that an inexperienced user finds it difficult to produce and compile information from different registers, that the computer systems are inflexible and that therefore extensive modifications of the system are required as information handling routines are changed or when new routines should be introduced into the system, that different computer systems are incompatible, which makes it difficult to transfer information between different systems, and that the computer systems are unwieldy and vulnerable since all units included in the system must be connected to each other or to a central computer in which all the information is stored.

The above-mentioned problems are well known in medical service where large quantities of information are being handled and therefore computerised information handling systems have been introduced in recent years. In medical service, there is one more problem: a great deal of the information handled is classified as secret. Unfortunately, it is difficult to maintain secrecy when casebooks, tests, laboratory reports etc. are handled by many different persons who have free access to the information.

In trade, the introduction of a bar code system has simplified and improved the handling of information. Each type of goods has been given an alphanumeric designation which is available on each article in bar-coded form. Further, in the computer systems of the shops all types of goods, the corresponding bar codes and the prices are stored. When a customer buys an article, the bar code is read on the article by a bar code reader and is entered into a computer which on a customer's receipt prints the type of goods in clear, together with the price. Also stock-taking has been simplified through the introduction of the bar code system since, in this context, the type of goods and the number of goods of this type in stock are registered by bar code readers. The information thus stored in the bar code reader is then transferred to a computer for further processing.

Also in medical service, certain attempts have been made to use bar-coded information. One example is patient's cards which have been provided with bar-coded personal data which are read by a bar code reader for identifying the patient.

In patent literature, the use of bar codes for information handling purposes is disclosed in, for example, U.S. Pat. No. 4,654,793. This publication describes a system for handling of information in connection with trade shows and the like. Each visitor is given an identification badge stating his registration number in bar-coded form. A person's visit to a booth in the exhibition area can be registered by reading the bar code on his identification badge. To make it easier for the operators of a booth to register a visitor's request for information concerning the products or his inquiries, the most demanded product information and the most frequent inquiries can be available on a sheet of paper in both human-readable and bar-coded form. Inquiries or requests for information concerning products are then registered in that the bar code of the inquiry or the requested product information and also the bar-coded registration number on the visitor's identification badge are scanned with a bar code reader.

The systems described above solve the problem with the time-consuming input of information to a computer. However, they do not solve the other problems stated above.

SUMMARY OF THE INVENTION

The object of the present invention therefore is to provide a new method of registering, transferring and storing information, which solves the above-mentioned problems and permits simple and flexible handling of information.

According to the invention, this object is achieved by a method described by way of introduction, which is characterised in that the computer is caused to print, in clear, each inputted bar code and the corresponding part information on a medium which permits reading of the bar codes by a bar code reader.

This method of registering and storing information brings a great number of advantages, all of which are obtained in that the bar code and the corresponding information are printed in clear side by side.

One advantage is that such a printout makes it possible to reenter all the information printed or selected parts thereof into the same or a different computer for processing.

A further advantage is that such a printout makes it easy to compile information from a large number of sources. If all the information is stored on paper in both human-readable and bar-coded form, new documents containing information from different sources can be prepared in that bar-coded part information is read from different sources by a bar code reader and then is output in human-readable as well as bar-coded form.

A still further advantage is that if information is stored by the method according to the invention, it can readily be copied and distributed to many persons who can each easily enter it into his computer.

One more advantage is that the method according to the invention renders it possible to transfer information from a sender to a receiver without the information being readable by intermediaries, if any. This is possible if the information is transferred in bar-coded form only from the sender to the receiver, since bar codes normally cannot be read without an auxiliary appliance.

Yet another advantage is that the method according to the invention makes it possible to file information in paper-bound form, awaiting subsequent data processing. If the information is classified, it can be stored in bar-coded form only. The method also permits compact filing, since the bar code information can be considerably diminished without the possibilities of reading by a bar code reader being lost.

One more advantage of the method according to the invention is that it permits the use of small local computer systems or individual computers, e.g. Personal Computers. The computer systems used need not even be compatible since the information can readily be moved from one computer to another by printing it on paper in human-readable and bar-coded form and subsequently reading it into the other computer by the bar code reader.

Another advantage of the method according to the invention is that it results in cost savings, since small, local computer systems are less expensive and simpler to modify, and since the nursing staff itself can carry out a great deal of the registering and storing of information now carried out by the office staff.

A still further advantage of the method according to the invention is that it permits simplified text processing. Since, for example, frequent phrases are bar-coded, running text can readily be entered into a computer and be printed on paper together with the corresponding bar code.

A further advantage is that the method according to the invention makes it possible to transfer information from one language to another. However, it is a requirement that the information to be transferred is bar-coded in an identical manner in the two languages between which the information should be transferred.

BRIEF DESCRIPTION OF THE DRAWINGS

Applications of the method according to the present invention will be described below with reference to the accompanying drawings which

FIG. 2 shows the application of the present invention when writing out prescriptions;

FIG. 6 shows the application of the method according to the present invention when transferring information from one language to another.

DETAILED DESCRIPTION OF THE PREFERRED EMBODIMENTS

The present invention is based on the condition that in a specific field, for example in medical service, alphanumerical designations are agreed on for at least part of the information to be handled. In medical service, such alphanumerical designations are assigned to e.g. diagnoses, types of care, testing methods, laboratory results, medicines, recurrent phrases, expressions for forming sentences and answers etc. For rational handling of information, all designations are bar-coded. All bar codes and the corresponding information in clear are then collected in catalogues or tables on the one hand on paper or the like, permitting reading of the bar codes by a bar code reader and, on the other hand, in the memory of the computers included in the information handling system.

It is convenient to provide in each country a central data base in which all the bar codes agreed on nationally or, preferably, internationally for one or more technical fields are stored together with the corresponding information in clear in the languages of the country. Moreover, it is convenient to store in the computers in the local information handling systems merely the bar codes (of course together with the corresponding text in clear) which are of use locally. For example, in a computer in a testing laboratory it could suffice to store test results, testing orders and recurrent text passages. If a local computer meets a bar code which is not stored in its memory, it can consult a superordinated computer having a greater bar code memory and, last of all, the central data base in the country.

Figure 1:
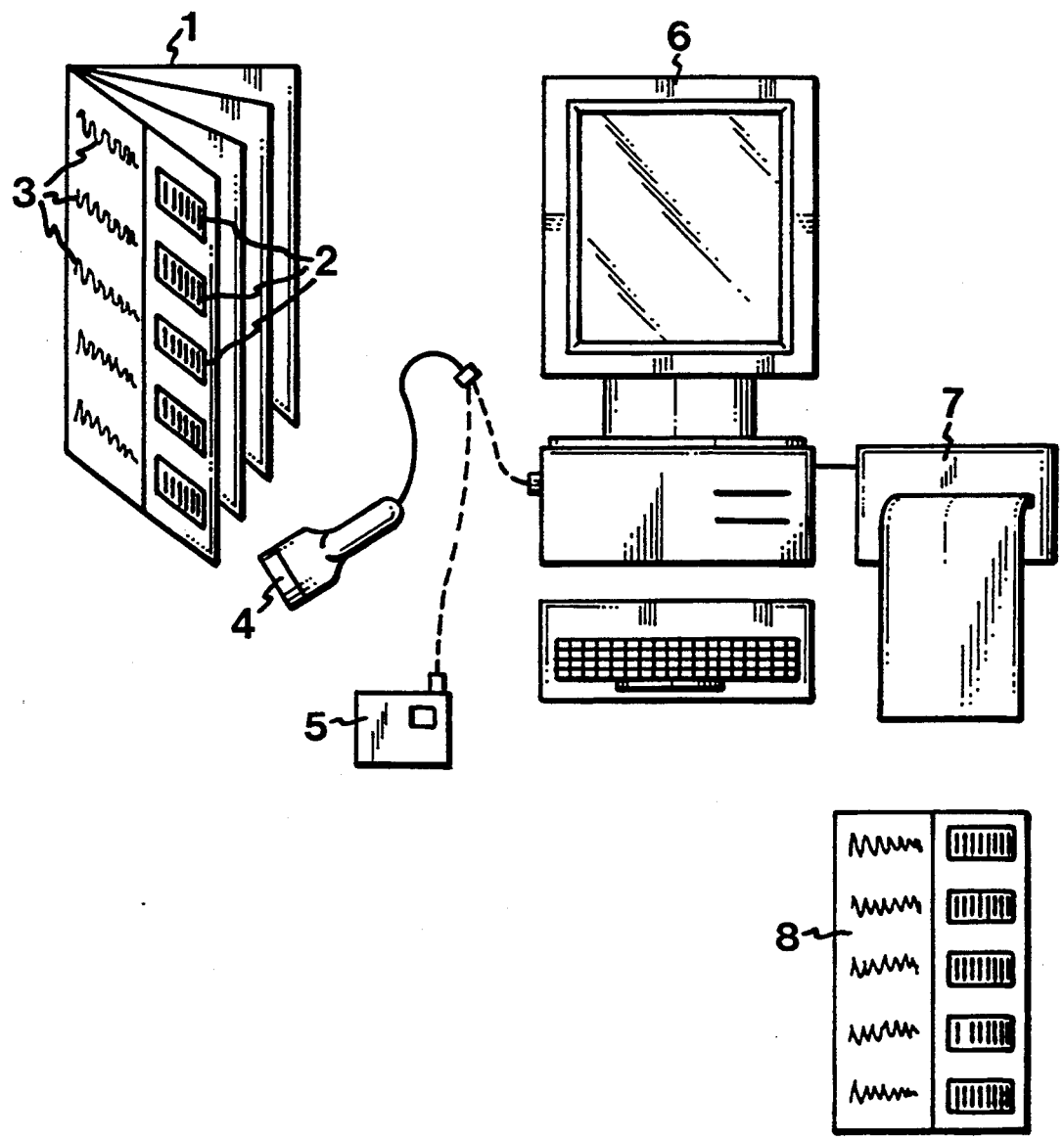
FIG. 1 illustrates a system by means of which the method according to the invention can be carried out.

FIG. 1 illustrates an example how a system for carrying out the method according to the invention can be designed. The system comprises a bar code catalogue 1 in which bar codes 2 for e.g. different diagnoses are stored. The bar codes 2 are to be found in a column at the extreme right on the pages of the catalogue, and adjacent each bar code 2, its meaning is printed in clear 3. Each bar code 2 represents an item of part information of the total information which can be handled by means of the bar code system. The system further comprises a bar code reader 4 which can be connected to a bar code memory 5 or directly to a computer 6 which is suggested to be a PC. Bar code readers and bar code memories are commercially available. The memory of the computer 6 comprises the contents of the bar code catalogue 1 which is stored electronically. The computer further comprises programs for receiving signals, which represent bar codes, from the bar code reader 4 or the bar code memory 5, programs for handling these bar code signals in different manners, programs for determining the meaning of the bar code signals, programs for printing them etc. Such programs can readily be designed by the expert and therefore are not described in detail. To the computer 6, there is connected a printer 7 which must be of a type which can print both in clear and bar codes.

Today, when a doctor goes his rounds, he or one of the staff makes notes by hand on paper. After the rounds, these notes are used as a base for e.g. dictating case-book text on tape or for writing out prescriptions by hand. The information dictated on tape is then written in clear or entered into a computer by a secretary. Such processing of information is very slow and inefficient and demands great resources. By means of the method according to the invention, this processing can however be simplified to a considerable extent, as will be described in the following.

Instead of the doctor providing himself with a pad and pen before making his rounds, he obtains the bar code reader 4 which he connects to the portable bar code memory 5. During the rounds, first he registers the patient's personal data by scanning a card with the bar code reader 4, on which card the patient's personal data are available in human-readable and bar-coded form. Subsequently he registers information on the patient's state of health, medication etc. by scanning selected bar codes in the bar code table 1 with the bar code reader. The information thus registered is stored in the bar code memory 5. After the rounds or when the bar code memory is full, the doctor connects the memory 5 to the computer 6 and instructs this to read The registered information and then to output the information in human-readable and bar-coded form on a sheet of paper 8. By means of the method according to the invention, information can thus be registered and, stored in a simple and reliable manner.

If the doctor works sitting at his computer, he can connect the bar code reader 4 directly to the computer instead of the bar code memory 5. In the manner stated above, he can then enter information into the computer 6 and have the information printed in clear. The information can be registered and stored without the doctor being acquainted with the word processing system of the computer. Also the commands for the computer can be available in bar-coded form and be given by scanning a suitable bar code 2 with the bar code reader 5. Any information which the doctor wants to register and store but which is not bar-coded can be entered in conventional manner from the keyboard of the computer 6 or by means of a "bar code producer" which bar-codes every inputted sign separately, thereby producing unique bar code sequences.

FIG. 2 shows the application of the method according to the invention when writing out prescriptions. The doctor now operates by means of a bar code reader. The computer screen can display a prescription form 20. The doctor fills in one or more boxes in the form by scanning selected bar codes in a bar code catalogue with the bar code reader. When the prescription is finished, the doctor can print it out by a printer, whereby the prescription obtains the appearance shown on the sheet 21, with the information in clear to the left and the corresponding information in bar-coded form to the right. Alternatively, the doctor can send the prescription directly to the chemist's computer for printing. Producing prescriptions by the method according to the present invention brings the advantages that drugs can be ordered quickly, that any errors caused by the doctor's hardly legible handwriting can be eliminated, that the risk that the patient tries to alter the prescription is reduced, and that information on drugs which is available in case-books or letters of referral can be readily transferred to prescriptions.

Figure 3:
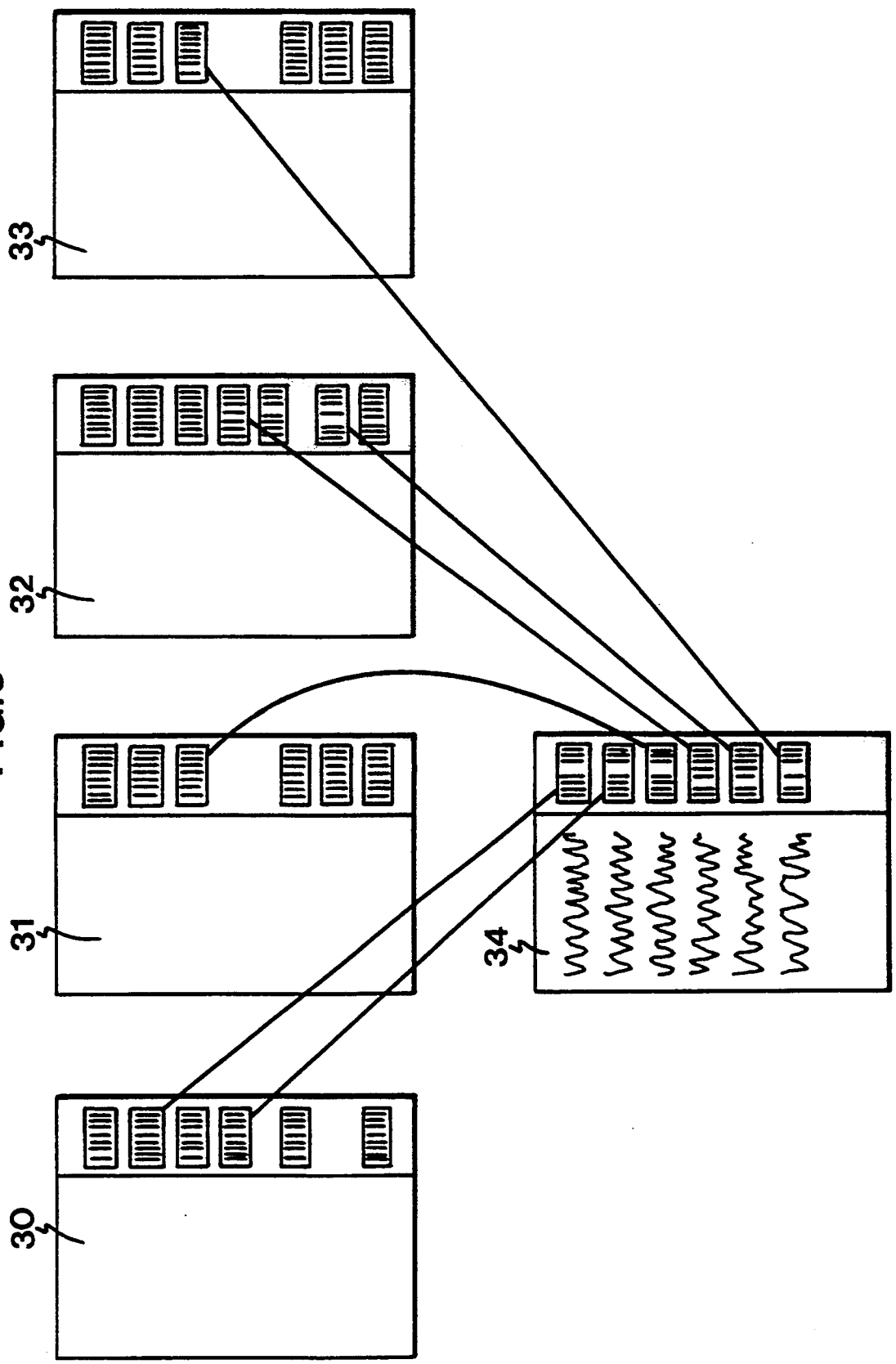
FIG. 3 shows the application of the present invention in compilation.

FIG. 3 shows how the method according to the present invention can be applied when compiling information from a number of sources. The Figure shows four sheets 30–33 with basic information, which have been produced by the method according to the present invention and which to the left contain information in clear and to the right the corresponding information in bar-coded form. If a person now wants to compile information from these sheets into a new document, he scans selected bar codes on the sheets 30–33 with a bar code reader. These bar codes are entered into a computer and printed in collected form on one sheet 34.

Figure 4:
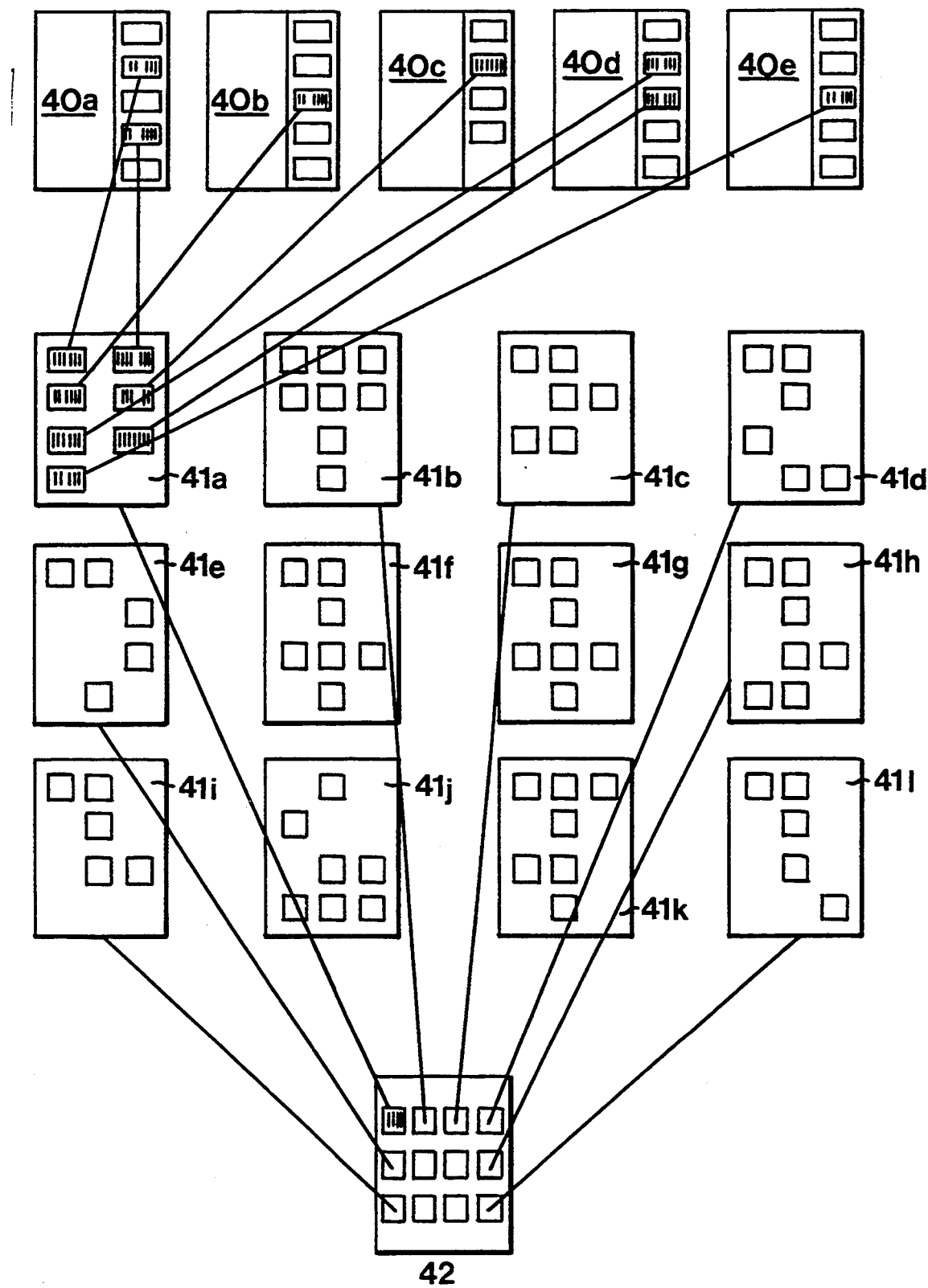
FIG. 4 shows the application of the present invention when filing information.

FIG. 4 shows how the method according to the present invention can be applied when filing information. First the information to be filed is assembled from different sources, e.g. from the sheets 40a–e, by reading bar codes and printing but the bar codes on a single sheet 41a. A plurality of such sheets 41b–e are produced correspondingly. Subsequently these sheets are considerably diminished and collected on a single sheet 42. When the information is to be used again, it is read from the sheet 42 by a bar code reader into a computer (optionally after first enlarging the sheet 42) and is then printed in human-readable plus bar-coded form on a sheet of paper.

Figure 5:
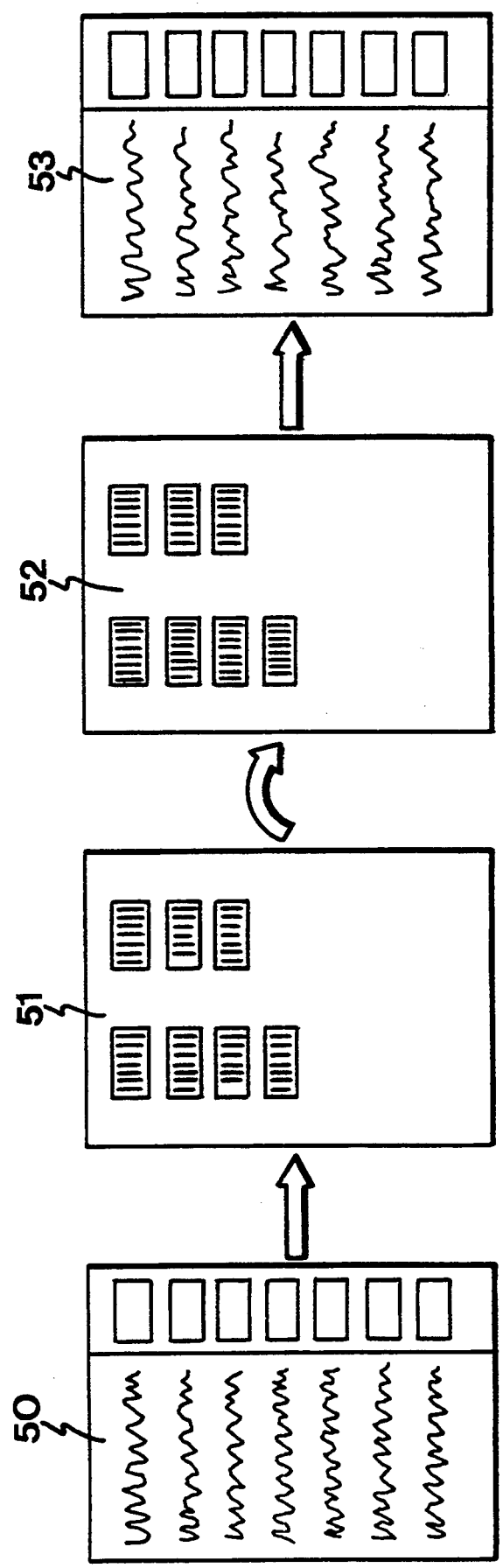
FIG. 5 shows how to obtain secrecy by the method according to the present invention.

FIG. 5 illustrates a further advantage of the present invention: it provides natural secrecy, since bar-coded information normally cannot be read without an auxiliary appliance. The Figure shows a first sheet 50 containing information in both human-readable and bar-coded form. If this information is classified and is to be transferred from one location to another, without any intermediaries having access to the information, it is read into a computer and printed but in bar-coded form on a sheet 51. The information on this sheet can then be transferred to another location by mail, by hand, by telecopier, via a TV-link, radio-link or the like, without the persons handling the information being able to read or interpret this without an auxiliary appliance. When the information has reached its receiver in bar-coded form on a sheet 52 or on a TV picture, the receiver reads it into a computer by means of the bar codes and prints the information on a sheet 53 in human-readable and bar-coded form.

FIG. 6 illustrates how the method according to the present invention can be applied when transferring information from one language to another. Now supposing that, for example, a doctor in Japan wishes to send information on a patient to a doctor in Sweden. The Japanese doctor then registers information from his bar code tables 60 by means of a bar code reader and prints this information in bar-coded form on a sheet 61. In the manner described above, this information is transferred to the doctor in Sweden, who when receiving the information reads it from e.g. a sheet 62 into his computer by means of a bar code reader and prints it in human-readable plus bar-coded form on a sheet 63. Alternatively, the bar-coded information entered into the Japanese doctor's computer can be transferred via a computer-link or a TV- or radio-link directly to the Swede's computer for printing. This technique of transferring information of course requires that common bar code designations have been agreed on internationally.

Finally, it should be pointed out that even if the method according to the present invention has been described by means of examples from medical service, the method is naturally not limited to this field of application, but can be used in all fields where computerised handling of information is needed and bar code designations for the information handled have been agreed on.

I claim:

1. A method for registering, transferring, and storing information, comprising the steps of:
   providing a plurality of predetermined items of part information;
   providing a predetermined bar code to each of the predetermined items of a part information;
   storing each of the predetermined items of part information together with the corresponding predetermined bar code in a first computer;
   storing each of the predetermined items of part information together with the corresponding predetermined bar code on a first medium which permits a bar code reader to read the predetermined bar codes from the first medium;
   storing each of the predetermined items of part information together with the corresponding predetermined bar codes in a second computer;
   providing information by selecting items of part information from the plurality of predetermined items of part information;

reading the bar codes that correspond to the selected items of part information by means of the bar code reader to register the selected part information;

entering the bar codes read by the bar code reader into the first computer;

printing both the bar code entered into the first computer and the corresponding items of part information on a second medium by the first computer; and transferring the bar codes read by the bar code reader and entered into the first computer from the first computer to the second computer before printing on a third medium by the second computer 2. A method as claimed in claim 1, wherein a print out of part information from the printing step is effected in a language other than that used for the part information on the first medium from which the bar codes are read by means of the bar code reader.

3. A method as claimed in claim 2, after entering the bar codes, further comprising a step of printing the entered bar codes only, which are used to be subsequently entered into the first computer for printing out the bar codes and the corresponding part information.

4. A method as claimed in claim 1, after entering the bar codes, further comprising a step of printing the entered bar codes only, which are used to be subsequently entered into the whichever first or second computer for printing out the bar codes and the corresponding part information.

5. A method for registering, transferring, and storing information, comprising the steps of:

providing a plurality of predetermined items of part information;

providing a predetermined bar code to each of the predetermined items of part information;

storing each of the predetermined items of part information together with the corresponding predetermined bar code in a first computer;

storing each of the predetermined items of part information together with the corresponding predetermined bar code on a first medium which permits a bar code reader to read the predetermined bar codes from the first medium;

providing information by selecting items of part information form the plurality of predetermined items of part information;

reading the bar codes that correspond to the selected items of part information by means of the bar codes reader to register the selected part information;

entering the bar codes read by the bar code reader into the first computer;

printing both the bar codes entered into the first computer and the corresponding items of part information on a second medium by the first computer; and wherein a print out of part information from the printing step is effected in a language other than that used for the part information on the first medium from which the bar codes are read by means of the bar code reader.

6. A method as claimed in claim 5, after entering the bar codes, further comprising a step of printing the entered bar codes only, which are used to be subsequently entered into the whichever first or second computer for printing out the bar codes and the corresponding part information.

* * * * *